J. H. A. BOUSFIELD.
AUTOMATIC SCALE.
APPLICATION FILED OCT. 16, 1916.

1,230,851.

Patented June 26, 1917.

Inventor
John H. A. Bousfield

J. H. A. BOUSFIELD.
AUTOMATIC SCALE.
APPLICATION FILED OCT. 16, 1916.

1,230,851.

Patented June 26, 1917.
5 SHEETS—SHEET 5.

Inventor

John H. A. Bousfield

By Whittemore Hulbert & Whittemore.

Attorneys ical scale to which my improvements are
applied;
UNITED STATES PATENT OFFICE.

JOHN H. A. BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT.

AUTOMATIC SCALE.

1,230,851.	Specification of Letters Patent.	Patented June 26, 1917.

Application filed October 16, 1916. Serial No. 125,939.

*To all whom it may concern:*

Be it known that I, JOHN H. A. BOUSFIELD, a citizen of the United States of America, residing at St. Johnsbury, in the county of Caledonia and State of Vermont, have invented certain new and useful Improvements in Automatic Scales, of which the following is a specification, reference being had therein to the accompanying drawings.

The invention relates to automatic scales of that type particularly designed for use in the weighing of grain or other free-flowing materials, and in which the filling and emptying of the hopper is controlled by automatically-operated inlet and discharge gates. With such constructions it is usual to open the discharge gate by the weight of grain in the hopper and to close the same by a counterweight when the pressure of grain is relieved. It is also usual to actuate the inlet gate by power derived from the movement of the hopper when relieved from the weight of grain therein and actuated by the unbalanced weight of the beam. To secure the proper timing a somewhat complex intermediate mechanism is required and difficulty is also experienced in controlling or checking the inertia of the falling weight when the hopper is suddenly relieved of the grain. In other words, the weight on the beam remains constant while the weight in the hopper is variable, and therefore an unbalanced condition is brought about upon the discharge of the grain, requiring the employment of springs or other cushioning means for arresting movement.

The present invention is designed to accomplish the closing and control of the inlet gate by a simplified mechanism and also to absorb the inertia of the moving hopper and beam so as to avoid shocks. This is accomplished, first, by actuating the inlet gate in its closing movement by stored power independent of the movement of the hopper or the lower gate; and second, by utilizing this power-storage means for absorbing the inertia of the moving beam and hopper, dispensing with the necessity of intermediate stops, dash-pots, springs or other cushioning means. The invention further comprises various features of construction as hereinafter set forth.

A is the supporting frame, B the hopper, and C the beam, which is fulcrumed on knife-edge pivots D upon the frame and supports the hopper upon knife-edge pivots E. F is the weight-box attached to the beam. G is the discharge gate for the hopper and H is the inlet gate, all of said parts as thus far described being of the usual construction.

Figure 2:
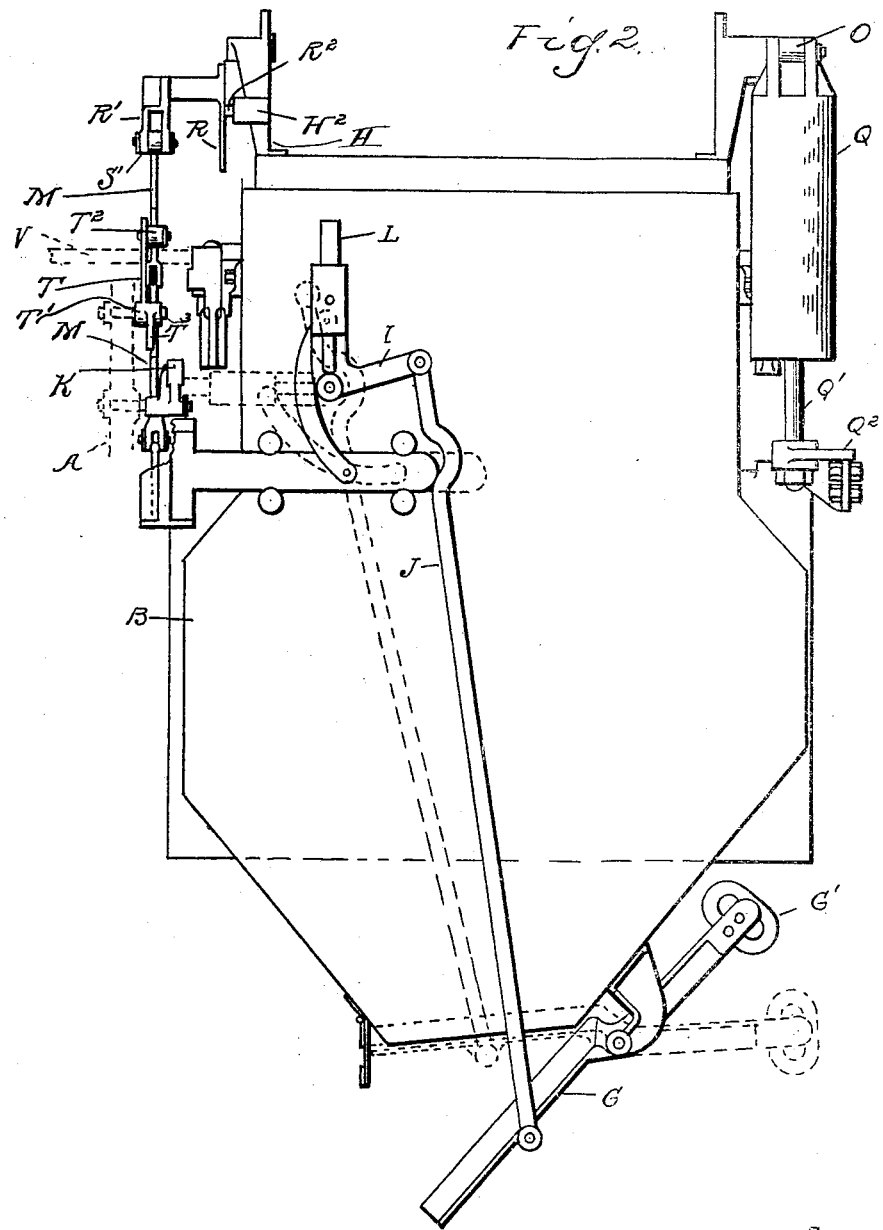
Fig. 2 is a side elevation thereof.
Figure 3:
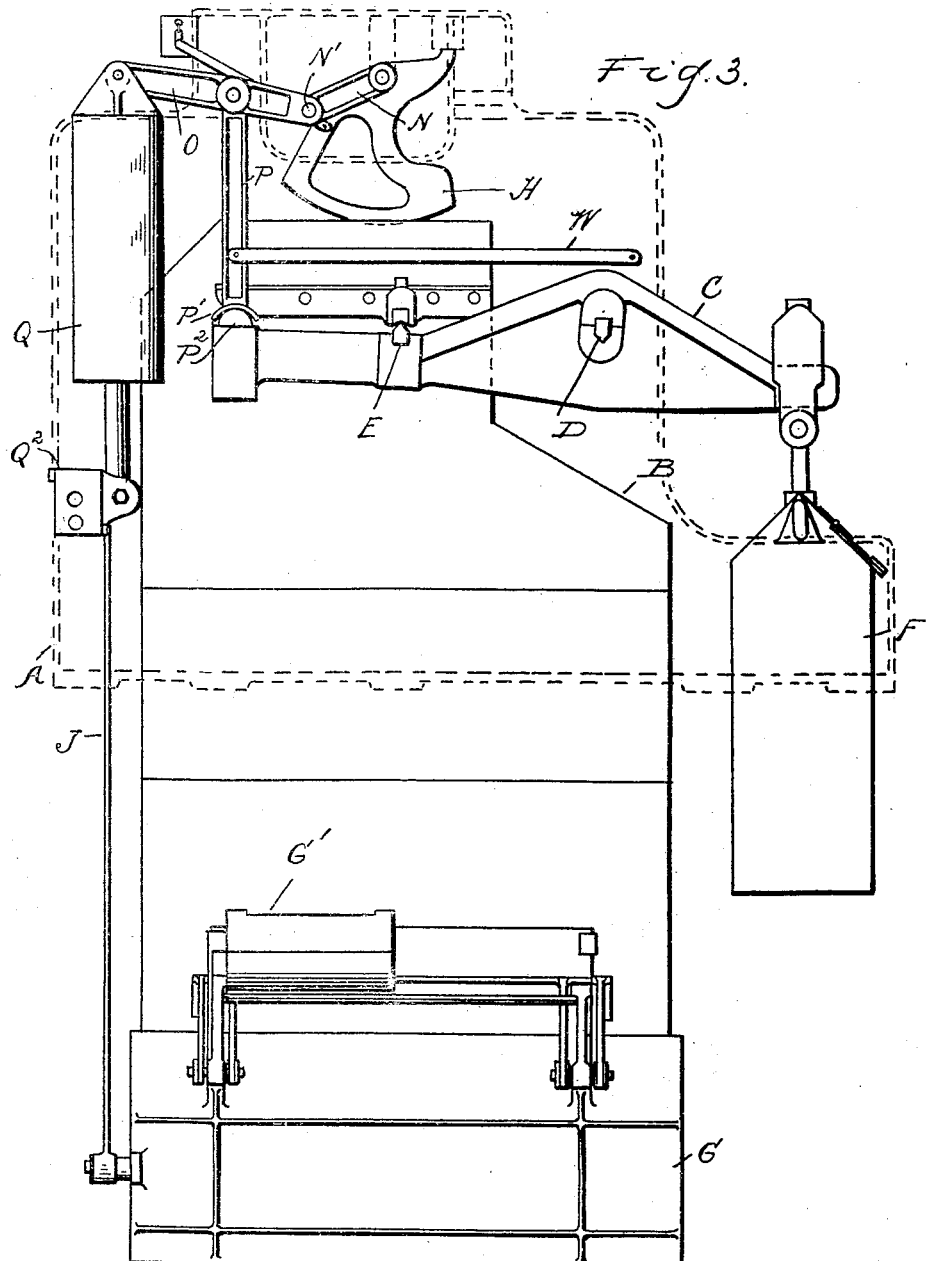
Fig. 3 is a rear elevation.
Figure 4:
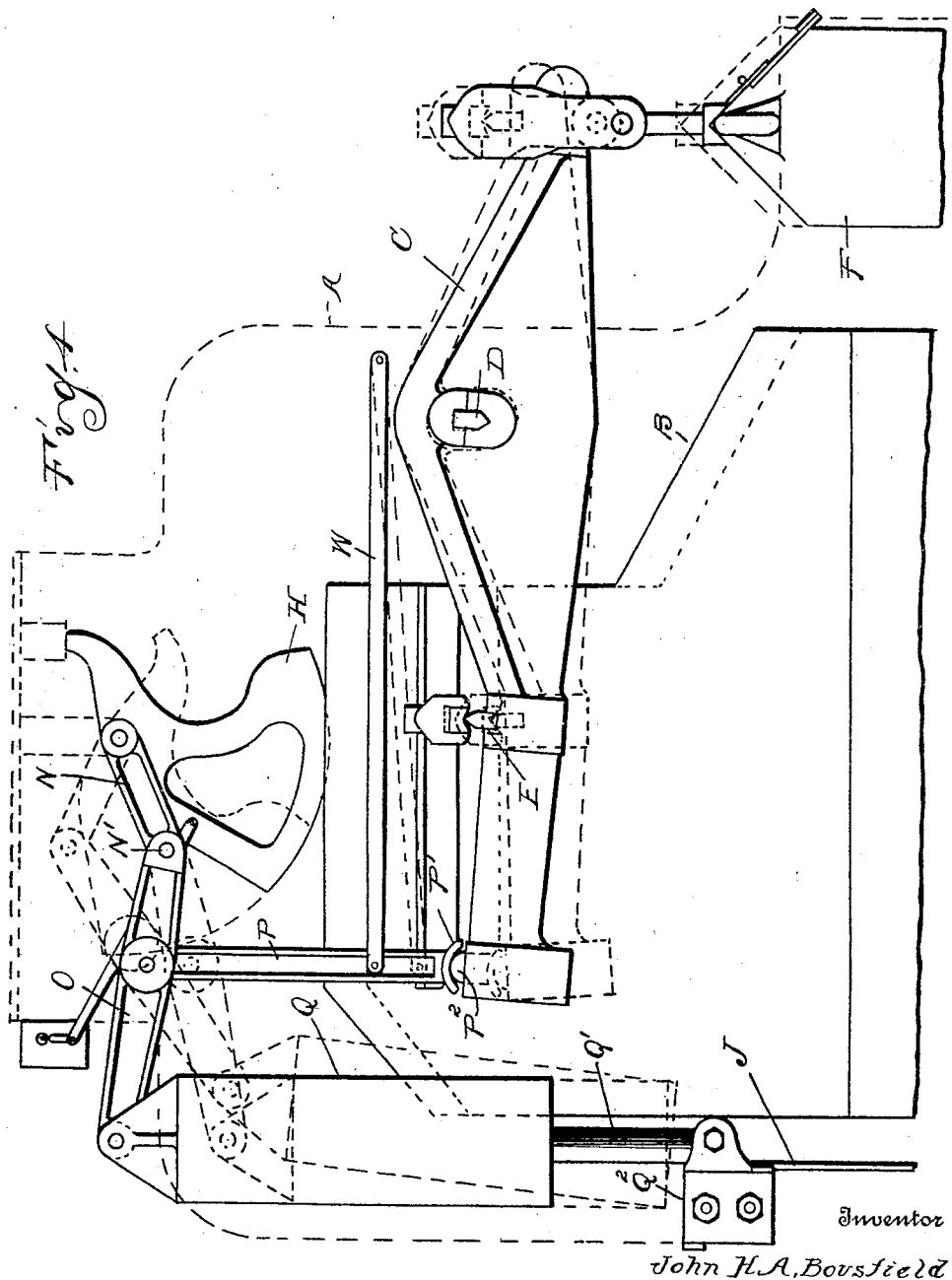
Fig. 4 is a diagrammatic view illustrating the operation.
Figure 5:
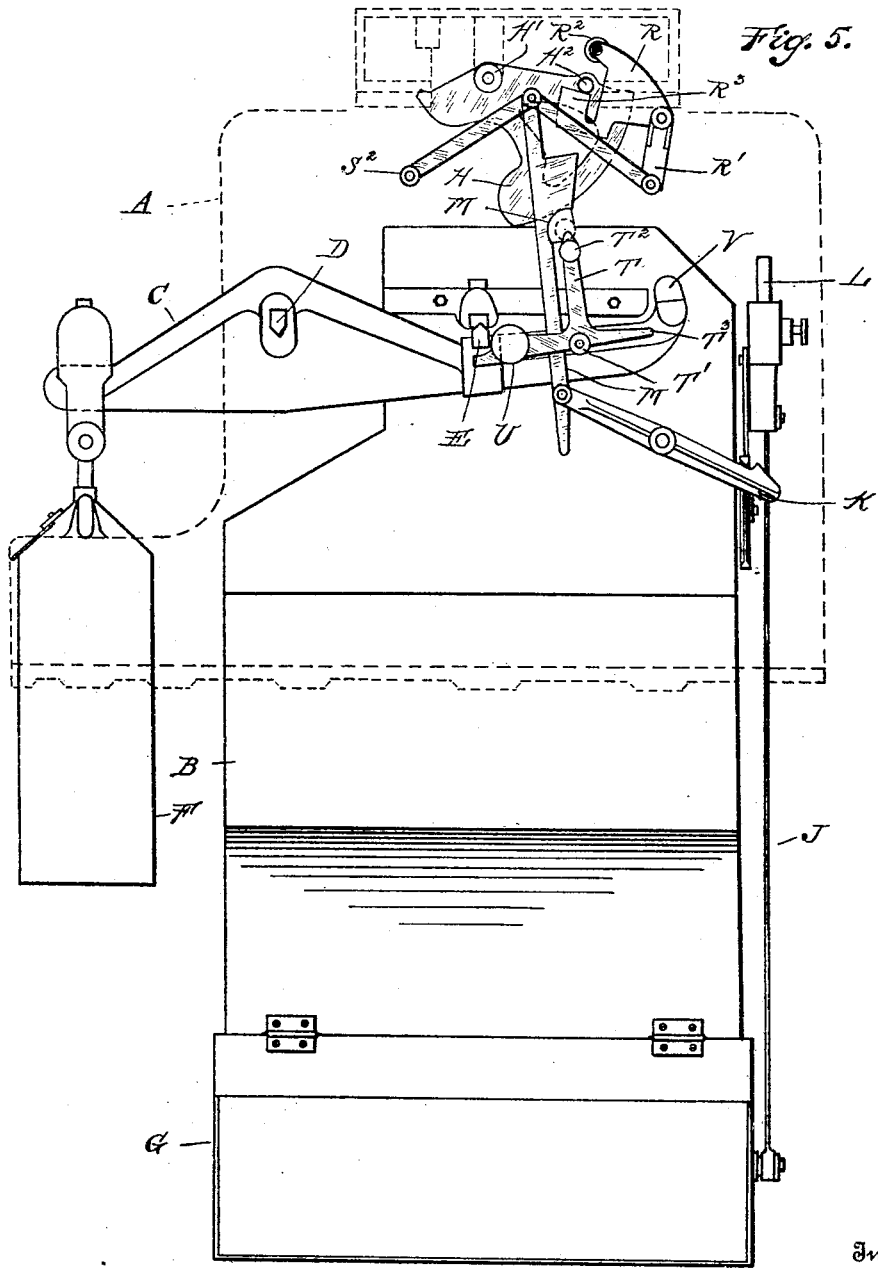
Fig. 5 is a view similar to Fig. 1 showing the inlet gate in dribble position.

The discharge gate G is counterweighted at G' to effect automatic closing when relieved from the weight of grain, and is locked in closed position by the usual toggle mechanism, comprising the rock-arm I and link J. The arrangement is such that in the position shown in dotted lines in Fig. 2, the toggle is past its center and will hold the gate locked, while in the position shown in full lines the gate is free to move. The toggle is tripped by a striker lever K, which throws upward a latch-arm L and moves the rock-arm of the toggle beyond its dead center, so that the weight of the grain upon the gate G may effect the opening. The striker-lever K in turn is actuated by a rod M, which is connected to the inlet gate mechanism so as to effect the tripping upon the complete closing of said gate.

As heretofore constructed, the inlet gate is usually closed by gravity and is opened by the operation of lifter rods actuated by the movement of the hopper-supporting means. This mechanism I have reorganized, dispensing with the lifter rods for direct actuation of the gate and providing a power-storage, as previously described. The specific construction is preferably as follows: The inlet gate H is pivoted at H' and is so balanced as to automatically close by gravity. Connected to the gate at one end thereof is a rock-arm N, which is pivotally attached to a lever O fulcrumed upon a rod P, the lower end of which at certain times rests upon the lever C, being preferably provided with a concave bearing P' engaging an upwardly-projecting lug P² on said lever. These parts are not, however, in contact when the beam is in weighing position. Q is a weight suspended from the free end of the lever O and guided by a slidable engagement with a vertical guide-rod Q' on the frame, the arrangement being such that when the gate is free to open the weight Q operating through the lever O and rock-arm N will actuate the same. At the opposite side of the machine there is arranged a rockable locking-plate R, which has an actuating rock-arm R' pivotally connected to one end of a pair of toggle links S S', the opposite end of said links being pivoted at $S^2$ to the frame and the rod M being attached to the pivotal connection between said links.

The locking-plate R carries a roller $R^2$, which when the toggle links are straightened is in contact with a roll or lug $H^2$ on the gate H, thereby holding said gate locked from opening. The plate R is also provided with a lug $R^3$, which in another position of adjustment stands in the path of the lug $H^2$ to hold the gate in nearly closed or dribble position. This position is assumed when the rod M is slightly lifted to place the toggle links S and S' in slightly angular position, and the parts are held in such position by a rockable trip T pivoted at T' to the frame and having a roller $T^2$ engaging a shoulder M' on the rod M, as will be hereinafter explained.

Figure 1:
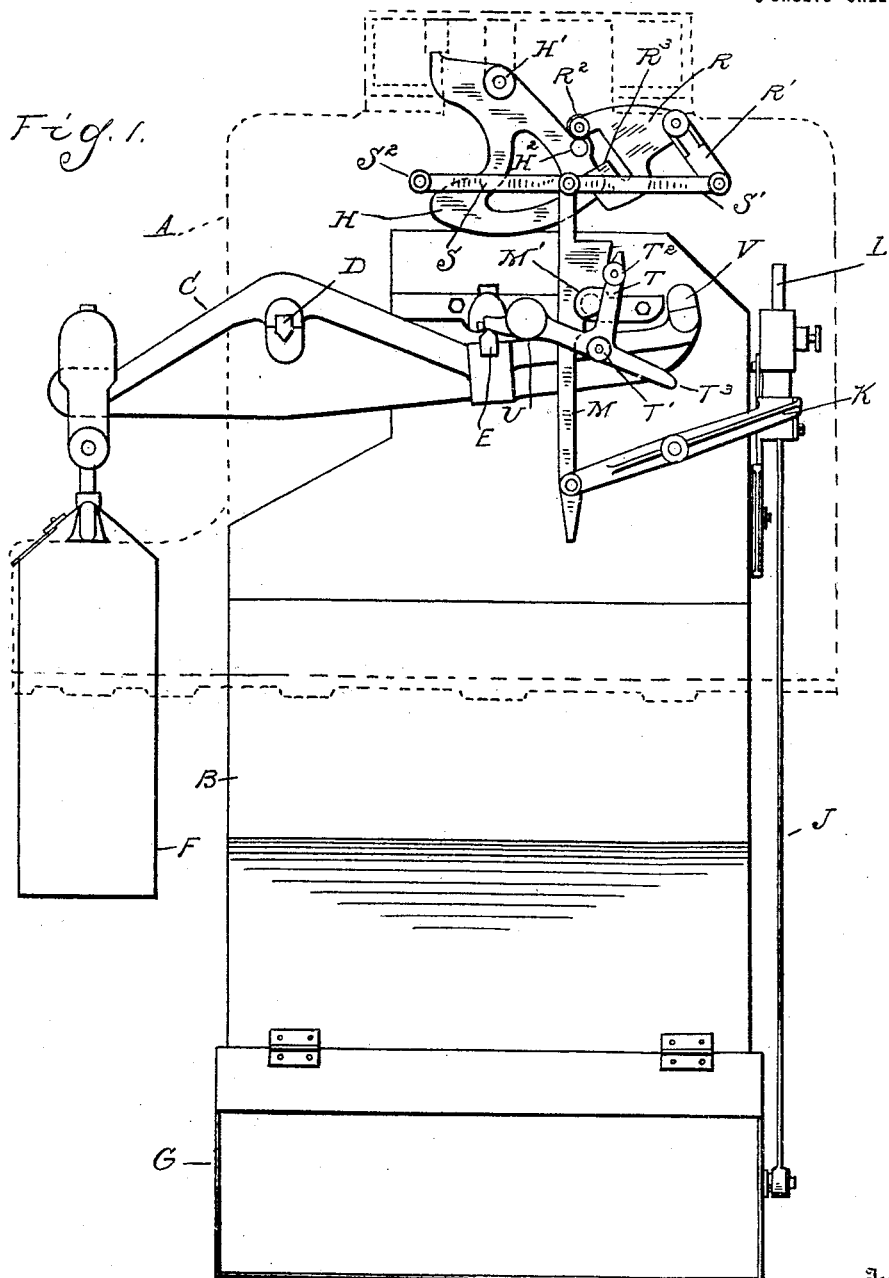
Figure 1 is a front elevation of an automatic scale to which my improvements are applied.

With the construction as thus far described, assuming the parts to be in the position shown in full lines in Fig. 1, the toggle links S and S' are straightened and therefore form a lock, which holds the rockable locking-plate R from movement and thereby locks the gate H closed through engagement of the roll $R^2$ with the lug $H^2$. On the opposite side of the machine the weight Q will be in full line position, where it is suspended from the lever O, the latter being fulcrumed at point P' where the strut P engages the lever C. Thus the pull of the weight tends to rock the arm N so as to open the gate. Such movement is, however, prevented by the locking of the gate and the weight Q is therefore held in its raised position. The position of the parts just described is one which occurs when the hopper has been relieved from the weight of an emptying charge of grain, but before the complete discharge and closing of the outlet gate G. When the discharge is completed the gate G will be automatically closed by its counterweight G', which will raise the rod J, swinging the toggle arm I, and causing the latch-arm L to strike the lever K, actuating the latter so as to lift the rod M and to break the joint of the toggle links S and S'. As soon as the links are moved out of alinement, the locking-plate R will release the gate H, and the weight Q, operating through the lever O, will rock the arm N and quickly move the gate H to full open position. The hopper is then rapidly filled with the incoming stream of grain until the accumulating weight combined with the impact of the discharge is sufficient to overbalance the weight F on the lever or beam C. When this occurs, the hopper will be lowered, the weight F rising, and the tilting of the lever C will lower the supporting lug $P^2$, permitting the dropping of the rod P. This withdraws the fulcrum from the lever O, and as the weight Q is resting upon a supporting shelf $Q^2$ on the frame the gate H will be relieved from its counterbalancing force and will be free to close by gravity. The closing movement continues until the lug $H^2$ comes in contact with the stop lug $R^3$ on the locking-plate R, which holds the gate in dribble position. The plate R is held in this position by engagement of the roll $T^2$ on the rock-arm T with the shoulder bearing M' on the rod M, the shoulder bearing M' as shown being formed by a roll carried by the rod M, and this engagement is effected by a counterweight U, operatively connected with the rock-arm T. In dribble position the impact of the descending column of grain is so lessened as to arrest further downward movement of the hopper until sufficient grain is added to effect a balance. The hopper will then fall until the lever is in balanced position and during such movement of the lever an arm V impinging against a trip-arm $T^3$ connected with the rock-arm T will rock the latter to withdraw the roll $T^2$ from the shoulder M', permitting the rod M to fall and the toggle links S and S' to assume a straightened or locked position. At the same time the gate H will fully close and will remain locked in this position by the engagement of the roll $R^2$ with the lug $H^2$.

The opening of the discharge gate G is automatically effected by the closing of the inlet gate H through the medium of the rod M and lever K, and the latter striking upward on the arm L and moving the toggle link I beyond its center, the weight of grain in the hopper operating upon the gate G will overpower the counterweight G' and will open the gate. When this occurs, the grain is rapidly discharged and as soon as the hopper is relieved of a portion of its weight the beam will be unbalanced and the weight F will cause a rapid upward movement of the hopper. Heretofore difficulty has been experienced in avoiding shocks due to the inertia of the movement of the weight F, and various expedients, such as dash-pots and other shock-absorbing devices, have been used to lessen the impact. With my improved construction all such devices may be dispensed with, as the upward movement of the hopper is opposed by the weight Q, and the work of lifting this weight will absorb sufficient power to avoid any impact and will permit the weight box to come gradually to its permanent stop, dispensing with all intermediate stops. At the same time the power thus absorbed is stored and is subsequently utilized in opening the gate, as has been previously described. In detail, when the hopper begins its ascent the weight Q is resting upon the shelf $Q^2$ and the gate H is in fully closed and locked position, as shown in full lines in Fig. 2. The rod P is resting upon the lever C, the lug $P^2$ engaging the concave bearing P'. As the hopper rises the lever will push the rod P upward and the pivotal connection N' between the lever O and rock-arm N will act as a fulcrum so that upward movement of the lever and rod P is opposed by the weight Q. This will absorb the power, producing a gradual rise of the hopper without any final shock. As the gate H is locked the reaction of the weight Q cannot produce any movement thereof, but as soon as the gate is released by the breaking of the toggle lock S S', the weight Q again becomes operative to open the gate. To hold the rod from displacement a pivoted link W is connected thereto and to the stationary frame.

What I claim as my invention is:—

1. In an automatic scale, the combination with a weighing hopper having inlet and discharge gates adapted for alternate operation, of means operating upon the rise of the hopper to absorb and store a portion of the power thereof, and means subsequently utilizing the power stored, in the operation of one of said gates.

2. In an automatic scale, the combination with the weighing hopper having inlet and discharge gates adapted for alternate operation, of means operating upon the rise of the hopper for absorbing and storing the power thereof, and means for utilizing the stored power to open the inlet gate.

3. In an automatic scale, the combination with a weighing hopper having inlet and discharge gates adapted for alternate operation, of mechanism for opening the inlet gate, means operating upon the rise of the hopper for absorbing a portion of the power thereof and storing the same for the actuation of said gate-opening mechanism, and means operating subsequent to the opening of the gate and upon the falling of the hopper for relieving said gate from its opening power and permitting the automatic closing thereof.

4. In an automatic scale, the combination with a weighing hopper and an inlet gate therefor adapted to automatically close, of mechanism for opening said gate, means operating upon the rise of the hopper for absorbing the power thereof and storing the same for the operation of said gate-opening mechanism, and means operating upon the falling of the hopper for relieving said gate-opening mechanism from its opening power to permit of the automatic closing.

5. In an automatic scale, the combination with a weighing hopper and an inlet gate therefor adapted to automatically close, of mechanism for opening said gate, a weight for actuating said mechanism, and means operating upon the rising of the hopper for lifting said weight to absorb and store the power of the upward movement.

6. In an automatic scale, the combination with a weighing hopper and an inlet gate therefor adapted to automatically close and lock, of a lever mechanism for opening said gate, a weight for actuating said lever mechanism when the gate is unlocked, means operating upon the rise of the hopper and while said gate is locked closed, for actuating said lever mechanism to raise said weight and thereby to absorb and store the power of the hopper rising movement, and means for unlocking said gate to permit said weight to open the same.

7. In an automatic scale, the combination with a weighing hopper and an inlet gate therefor adapted to automatically close and lock, of a weight supplying the power for opening said gate, and connecting mechanism between said gate, weight and hopper, for lifting the weight to absorb and store the power of the rising movement of the hopper and for releasing the gate from the power of the weight when the hopper descends to permit automatic closing.

8. In an automatic scale, the combination with a weighing hopper and an inlet gate therefor adapted to automatically close and lock, of a rock-arm for opening said gate, a lever pivotally connected to said rock-arm, a weight connected to the opposite end of said lever, and a fulcrum bearing for said lever, raised and lowered by the corresponding movement of said hopper, for the purpose described.

9. In an automatic scale, the combination with a weighing hopper, of an inlet gate therefor adapted to automatically close and lock, a rock-arm for opening said gate, a lever connected to said rock-arm, a weight connected to the opposite end of said lever, and a connection between said lever and said hopper constituting a lifting means for said weight in the closed and locked position of said gate, and forming a fulcrum for said lever, to permit the actuation of the same by said weight when said gate is unlocked to open the same.

10. In an automatic scale, the combination with a weighing hopper and inlet gate therefor, adapted to automatically close and lock, of a weighted beam supporting said hopper, a rock-arm for opening said gate, a lever connected to said rock-arm, a weight connected to the opposite end of said lever, a strut supported on said beam and having intermediate connection with said lever, constituting an actuating means for raising said weight in the locked position of said gate, and a fulcrum for said lever when actuated by said weight to open said gate.

11. In an automatic scale, the combination with the hopper, the supporting beam, weighing weight and a gate controlling the inlet to the hopper, of means operating when the hopper is relieved of its load for absorbing and storing the power of the moving parts, and means for utilizing said power in operating said gate.

12. In an automatic scale, the combination with a weighing hopper having inlet and discharge gates adapted for alternate operation, of means operating upon the rise of the hopper for absorbing and storing a portion of the power thereof and for actuating one of said gates in a portion of its movement by said stored power independent of the movement of the hopper.

In testimony whereof I affix my signature in the presence of two witnesses.

JOHN H. A. BOUSFIELD.

Witnesses:
ERNEST E. HOLBROOK,
GEO. R. BOLLINGER.

Copies of this patent may be obtained for five cents each, by addressing the "Commissioner of Patents, Washington, D. C."